Jan. 3, 1950
G. A. ESPERSEN
2,493,661
MAGNETRON CAVITY STRUCTURE AND
METHOD OF MANUFACTURE OF SAME
Filed March 15, 1947
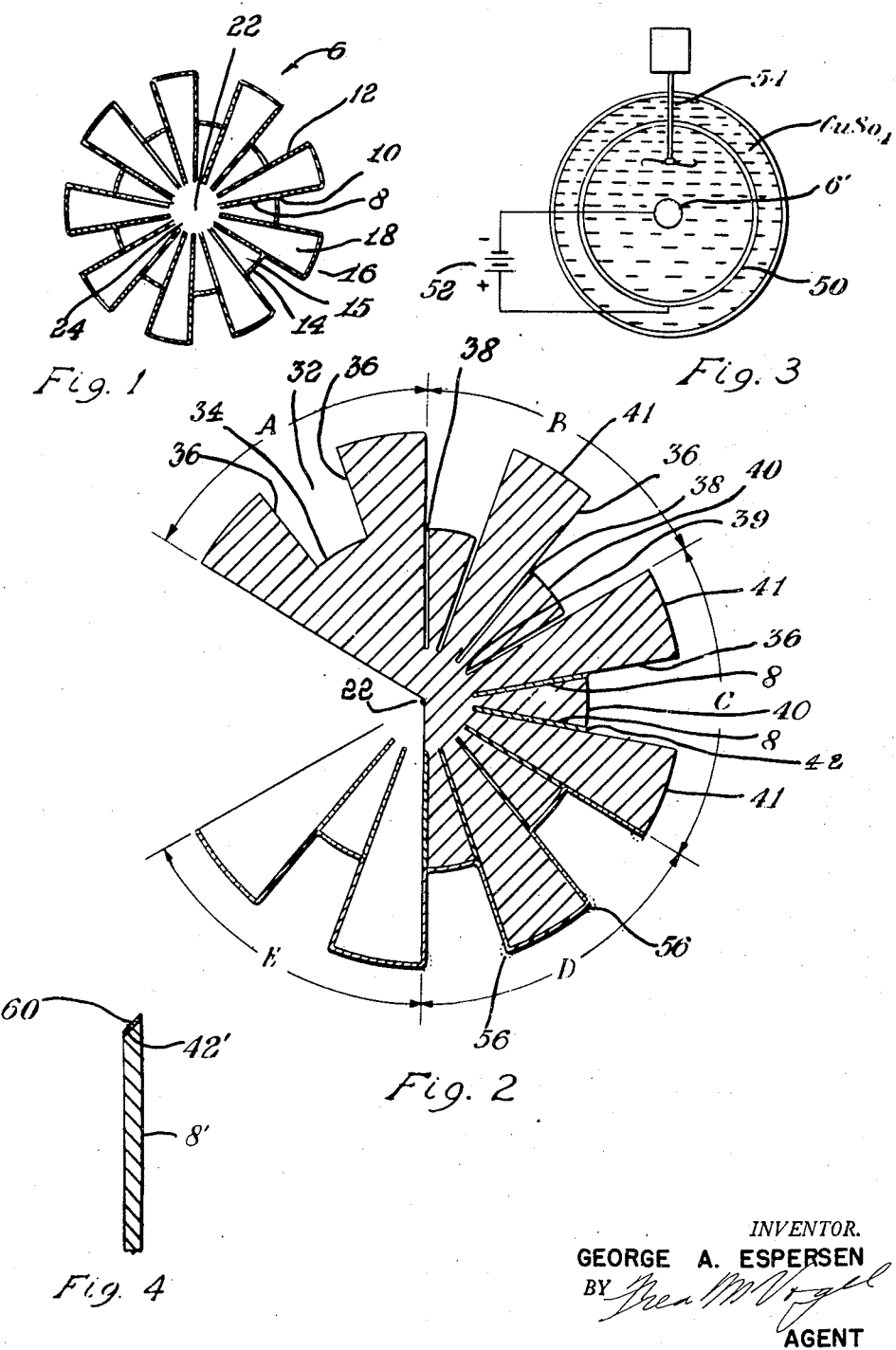
*INVENTOR.*
GEORGE A. ESPERSEN
BY
AGENT Patented Jan. 3, 1950

2,493,661

UNITED STATES PATENT OFFICE 2,493,661

MAGNETRON CAVITY STRUCTURE AND METHOD OF MANUFACTURE OF SAME

George A. Espersen, Dobbs Ferry, N. Y., assignor to Philips Laboratories, Inc., Irvington on Hudson, N. Y.

Application March 15, 1947, Serial No. 734,903

9 Claims. (Cl. 250—27.5)

My invention relates to magnetrons, and more particularly to a magnetron cavity structure and the method of manufacture thereof.

Magnetron cavities which are designed for operation at ultra-high frequencies, for example in the centimeter wave band range, are difficult to manufacture because of the exactness required in the dimensions and the small tolerances permissible if operation is to be satisfactory. One of the common methods heretofore utilized has been to press the cavity out of copper or other high conductive metal by means of a hob. The hob was exceedingly difficult to produce and the desired exactitude was not always achieved. Furthermore, the cavities pressed out by this method were not invariably of the same size within the required limits of tolerance due to slight non-similarity of the metals used for the cavity structure. Moreover, for high frequency cavity structures wherein the cavities had dimensions of the order of a radius of say .2 to .4 inch, this technique was time consuming, and was particularly wasteful in time for the construction of experimental models or for the construction of only a few magnetron cavity structures of a given design.

It is an object of my invention to provide a new and novel magnetron cavity structure.

It is another object of my invention to provide a new and novel method of manufacturing a magnetron cavity structure.

It is a further object of my invention to provide an integral magnetron cavity structure which is composed of different metals.

It is a further object of my invention to provide a magnetron cavity structure which can handle greater amounts of power than structures of like size heretofore manufactured.

Another object of my invention is to provide a method for the manufacture of magnetron cavity structures which is more expeditious and economical than prior methods.

Other objects, advantages and novel features of the invention will become apparent as the specification progresses.

In accordance with my invention the foregoing objects are realized by forming a matrix having a contour conforming to a portion of the cavity to be formed and slotted regions in which are inserted metal vane-like portions which are to constitute another portion of the cavity to be formed. The said vanes are initially assembled in the said matrix and the so formed assembly is electroplated whereby a composite assembly of vanes and matrix is formed. The said composite assembly is then subjected to a suitable solvent which preferentially dissolves the matrix, leaving intact the vanes and electrodeposit thereby to form the desired magnetron cavity structure. In a preferred arrangement, in accordance with the invention, the vanes consist of a refractory metal, and in order to facilitate the adherence of the electrodeposit to the same, I provide the refractory metal with an initial surface plating at the region where the two metals are joined, as later to be more fully described.

In order that the invention may be more clearly understood and readily carried into effect it will now be described more particularly with reference to the accompanying drawing in which:

Figure 1 is a cross-sectional view of a magnetron cavity structure of the so-called "rising sun" type;

Fig. 2 is a cross-sectional view of sectors which illustrate the successive steps of manufacture of the structure of Fig. 1; and Fig. 3 illustrates schematically the electro-deposition of metal on the matrix and inserted members.

Fig. 4 is a cross-sectional view of an optional insert or vane which may be used by the method of the invention.

Referring now to Fig. 1, the magnetron cavity structure 6 has radially extending vanes or members 8 of copper, and adjoining thereto at the outer ends 10 of vanes 8, radial extensions 12 also of copper. The extensions 12, as will appear more particularly hereinafter, are formed by electro-deposition. The circumferential portions 14 complete the enclosures of the smaller cavities 15 and the outer circumferential portions 16 complete the enclosures of the larger cavities 18. The entire cavity structure thus provides nine large electro-magnetic cavities 18, and nine smaller electro-magnetic cavities 15, each smaller cavity being located diametrically opposite a larger cavity.

Fig. 2 is a cross-sectional view of the 60° sectors A, B, C, D, and E of the structure of Fig. 1 in various stages of manufacture. The view is taken normal to the axis 22. Referring first to sector A of Fig. 2, first I take a cylindrical piece of aluminum having an outer radius after polishing which is equal to the desired internal radius of the larger cavity sections 18. In the illustrated structure this radius is .3175 inch. I prefer to use copper-free machinable aluminum which may be accurately worked on a milling machine. I then mill nine slots 32 at regular intervals about the axis as shown in sector A of Fig. 2. Each slot 32 is milled to a depth so that the inner face 34 thereof is .1985 inch radially distant from axis 22. The side faces 36 of the slots are substantially radial. I find it desirable to cut the slot 32 somewhat scant, for reasons which will appear subsequently, and therefore the faces 36 of each slot 32 are separated very slightly less than 20°.

Referring now to sector B of Fig. 2, I next cut slits 38 along the sides 36 inwardly toward the axis 22, using a thin circular saw on the milling machine. These slits are .008 inch wide and extend radially and axially. In cutting slits 38 I prefer the face 36 to join smoothly with the side of the slit. Therefore, I cut away the slight portion which I have allowed to remain on the face of the slots for that purpose, which may amount to a matter of a thousandth of an inch or so. Slits 38 are cut to such a depth that the distance of the terminations 39 thereof from axis 22 is .0455 inch corresponding to the desired internal radius of the inner terminations of vanes 8 of Fig. 1, or slightly less, for a reason which will appear hereinafter. This leaves nine small matrix segments 40 and nine large matrix segments 41 which substantially correspond respectively in dimensions to the desired small cavities 15 and large cavities 18 of Fig. 1.

Referring now to sector C of Fig. 2, copper inserts or vanes 8, preferably of oxygen-free high conductivity copper, are made deep enough to fit the slits 38 and just wide enough to make a close sliding fit therein. After de-greasing the matrix, I then slide these vanes 8 into slits 38. I prefer to form a face 42, corresponding to the outer end 10 of Fig. 1 on one of the edges of each vane 8 at an angle of about 45 degrees so that after insertion a smooth joining at substantially a 45° angle is made between smaller matrix segments 40 and faces 36 of the larger matrix sigments 41, as illustrated. The appearance of the cross-section of the matrix now presents the larger segments 41 made in this instance of aluminum with the copper vanes 8 joining the smaller segments 40 to the matrix body. There are nine of the slots 32 and there are also nine each of the segments 40 and 41. There are eighteen copper inserts or vanes 8.

Referring now more particularly to Fig. 3, before returning again to Fig. 2, I have shown in schematic form the method whereby the assembled matrix and the inserted vanes 8 are electroplated. I make a copper sulphate solution or other appropriate electrolyte for copper plating, in which I place the matrix and the inserted vanes, which should be first cleaned to remove grease and oxides. Assembly 6' of matrix and vanes is indicated schematically in Fig. 3 by a circle. Assembly 6' is connected as the cathode and a tubular cylinder 50 of copper as the anode with any suitable power supply 52. Also indicated in a general way is an agitator 54 to stir the liquid electrolyte to encourage uniform plating. I have found that it is well to utilize an anode which is at least six to eight times as large in radius as the cathode 6', and a low average initial current density of the order of 3 amperes/square decimeter. I have also found that it is best to apply the plating in coatings. Preferably, the first coat or two should not exceed about .005 inch. After the first coat is applied the coated assembly should be removed from the electrolyte and polished. I find it convenient to polish the plated assembly on a lathe using a fine crocus cloth on the outer circumferential surface to smooth any heavy granular deposit. No attention is necessary to the plated inner faces 36 or the plated circumferential faces 34, as the copper deposits with such slowness on these latter surfaces that no heavy granular copper forms, as is likely to form on the outer circumferential surfaces where it deposits more rapidly. I have found that the angled faces 42 tend to keep a more uniform plating in the corners and give a more secure structural rigidity to the finished cavity, although a square face may be used also. If desired the vanes 8 may be made deep enough to reach radially to the outermost diameter of the face 36. After plating and polishing successively and slowly to a sufficient desired depth the cathode 6' may be removed. It may be desirable once or twice during the process to file slightly the corners 56 which may deposit too freely, because of the increased current density at the extending corners as indicated by the dotted lines, which are greatly exaggerated.

Upon removal from the final plating bath, the appearance of the matrix with its inserted vanes and plating will be as shown in the sector D of Fig. 2. The assembled matrix and vanes then constitute a substantially integral structure of aluminum and copper, with the copper forming the prospective cavity walls of the proper dimensions.

At this point it is convenient to cut the assembled matrix and cavity structure into the desired axial lengths, so that, upon dissolution of the aluminum, the final cavity structure is fully prepared for assembly in the magnetron, and one of the faces 16 may be removed to afford a junction with a wave-guide output in the assembled magnetron. Also at this point it may be found desirable to drill an axial hole in the matrix which will more accurately dimension the ends 39 of the vanes by cutting them simultaneously to the desired diameter, as I have discovered that the vanes are not always completely inserted to the desired depth. The aluminum body affords a structural strength which avoids any distortion of the prospective cavity walls during the cutting or drilling process, if care is exercised, especially in cutting, since the copper is not closely bonded to the aluminum and may be stripped therefrom if one is careless. I use a rubber bonded wheel for cutting the assembly into axial lengths. The wheel is 6 inches in diameter and $\frac{3}{32}$ inch thick, rotating at a speed of 5500 R. P. M. The work is slowly rotated tangent to the grinding wheel in the opposite direction of rotation. Similar care must be exercised in cutting away the one face 16 to avoid stripping the copper from the aluminum. Thus my new method affords a certain economy in manufacture, for I may make the initial matrix sufficiently long to cut twelve or more such lengths from the plated assembly.

The next step is to dissolve the aluminum by a selective or preferential liquid bath, thereby leaving a structure such as illustrated by the sector E of Fig. 2 or the finished cavity structure of Fig. 1. This may be accomplished conveniently in this case by immersing the plated assembly in a bath of caustic solution, for example sodium hydroxide, which attacks the aluminum but not the copper.

Referring now more particularly to Fig. 4, the vane or insert 8' is made of molybdenum and has a thin plating of copper 60 on the face 42'. Vanes 8' may be used instead of the copper vanes 8 of Figs. 1 or 2. In order to attach a layer of copper to the face 42', I first hydrogen-fire the molybdenum vane to clean it and to reduce any oxide. Next the sides adjacent to face 42' are masked and then the exposed face copper plated.

Following the plating, I remove the masking and in order to bind securely the small copper layer I heat treat the vane in hydrogen. It is clear that a copper plating could be joined to the face 42' to the exclusion of the adjoining sides by plating and then polishing the plating from the sides without necessarily using a masking technique. Thereafter I insert vane 8' in the slit 38, having computed the radial length thereof so that after copper plating the face 42' the copper plated surface is of substantially the same length as the vane 8. Thereafter the assembled matrix and vanes may be copper plated as before, and the matrix may be dissolved as before. The solvent may be warm, or at room temperature, but it is best not to have it at a boiling temperature. The resulting structure is the same as that of Fig. 1, except that the vanes 8 will be made of molybdenum and the remainder of the structure will be made of copper.

One advantage of such a structure resides in the fact that the vanes 8' close to the cathode space 24, being made of molybdenum, a refractory metal, can withstand a great amount of heat without any deleterious effects, whereas the remainder of the wall portions, although of copper, are exposed on the outside of the structure to cooling effects by radiation or cooling conduction currents or both. The refractory metals tungsten or molybdenum may be used as vanes or inserts. The same process used to make the structure with molybdenum vanes may be used to make one with tungsten vanes. Although the Q of the resulting cavity structure is lowered because the electrical conductivity of the molybdenum is less than that of copper, the greater power handling capacity of the final magnetron more than compensates for the lowered Q. Moreover, a filament such as tungsten highly heated may be utilized and the heat thereof does not destroy or adversely affect the cavity walls.

While I have described my invention with a specific example and application, other variations will suggest themselves to those skilled in the art. As an example of some of these variations it may be mentioned that the matrix may be made of aluminum and the plating and inserts of silver, or the matrix may be made of copper and the plating and inserts of gold. In the latter case a selective solvent might be nitric acid. Any suitable metal may be used for the plating, and an appropriate metal for the matrix. It will also be apparent that one might use a plastic matrix and an appropriate metal and solvent, although to the present time I have found it best to utilize an aluminum matrix with copper plating or an aluminum matrix with the composite cavity structure of molybdenum and copper, as herein described. If a plastic matrix is used, the finely granular metal initially deposited on the matrix to form a conductive surface for electrolytic plating causes a granular inner cavity surface which may be smoothed by a bath which attacks slowly the metal used. Because of these many variations which it is impractical to describe completely, I intend to include these and such other variations as may suggest themselves to those skilled in the art without departing from the scope and spirit of the invention as defined in the appended claims.

What I claim is:

1. The method of manufacturing a magnetron cavity structure comprising the steps of inserting members of a first metallic material into a matrix of a second material different from said first material, depositing a metallic material different from said second material on exposed portions of the matrix and inserted members and preferentially removing the matrix whereby a cavity structure is formed with said inserted members forming a portion of the walls of said cavity structure.

2. The method of manufacturing a magnetron cavity structure comprising the steps of forming a matrix of a first material, inserting in the formed matrix members of a second metallic material, plating on the exposed portions of the matrix and inserted members a metallic material different from said first material, and removing the matrix whereby a cavity structure is produced having walls formed in part by said inserted members and in part by said deposited metallic material.

3. The method of manufacturing a magnetron cavity structure comprising the steps of cutting a slit in a matrix of a first material, making a vane of a second metallic material to be received by said slit, inserting said vane in said slit, depositing a metal upon exposed portions of said assembled vane and matrix, and preferentially dissolving said matrix whereby a magnetron cavity structure is produced.

4. The method of manufacture of a magnetron cavity structure comprising the steps of forming a matrix of a first metallic material with slotted portions adapted to receive an insert, forming an insert of a different metallic material to be received by said slotted portions, inserting said inserts into said slotted portions, plating exposed portions of said assembled matrix and inserts with a highly conductive metal different from said matrix material, and preferentially dissolving said matrix whereby a magnetron cavity structure is produced.

5. The method of manufacturing a magnetron cavity structure having radially extending vane-like portions, comprising the steps of milling slots extending axially and radially in a cylindrical member of a first metal, cutting slits extending axially and from along the sides of said slots radially inwards, inserting metallic inserts in said slits, plating exposed portions of said member and said inserts with a metal, and preferentially dissolving the metal of said member whereby a magnetron cavity structure is produced in which said inserts form said vanes.

6. The method of manufacturing a magnetron cavity structure having vane-like portions of a refractory metallic material and the remaining cavity wall portions of a different metallic material, comprising the steps of milling slots in a cylindrical member of a metallic material different from said cavity structure materials, cutting axial slits in said member extending radially inward from along the sides of said slots, forming vane-like inserts of a refractory metal adapted to be received by said slits, inserting said inserts in said slits, electro-depositing a highly conductive metal on exposed portions of said assembled member and said inserts, and preferentially dissolving the metal of said member whereby a magnetron cavity structure having vane-like portions of a refractory metallic material and having the remaining cavity wall portions of a different metallic material is produced.

7. The method of manufacturing a magnetron cavity structure having vane-like portions, comprising the steps of milling slots in a cylindrical member of aluminum, cutting axial slits extending radially inward from along the sides of said slots, forming vane-like inserts of a metal other than aluminum and adapted to be received by said slits, inserting said vane-like inserts in said slits, successively electro-plating a highly conductive metal on exposed portions of said assembled member and said inserts and polishing said electro-plated assembly, cutting said plated and polished assembly into axial lengths, and preferentially dissolving the aluminum whereby a magnetron cavity structure having vane-like portions is produced.

8. The method of manufacturing a magnetron cavity structure having vane-like portions, comprising the steps of milling slots in a cylindrical member of aluminum, cutting axial slits extending radially inward from along the sides of said slots, forming vane-like inserts of a metal other than aluminum and adapted to be received by said slits, inserting said vane-like inserts in said slits, successively electro-plating a highly conductive metal on exposed portions of said assembled member and said inserts and polishing said electro-plated assembly, axially drilling and cutting said plated and polished assembly into axial lengths, and preferentially dissolving the aluminum whereby a magnetron cavity structure having vane-like portions is produced.

9. A magnetron cavity structure defining radially mounted alternate small and large sector-like cavities, said small cavities being diametrically opposed to said large cavities, said structure comprising vane-like cavity wall portions of a preformed metal intervening and separating said small and large cavities, and cavity wall portions electro-deposited and integral with said vane-like portions.

GEORGE A. ESPERSEN.

REFERENCES CITED

The following references are of record in the file of this patent:

UNITED STATES PATENTS

| Number | Name | Date |
|---|---|---|
| 1,802,185 | Read | Apr. 21, 1931 |
| 1,919,984 | Murphy | July 25, 1933 |
| 2,247,077 | Blewett et al. | June 24, 1941 |
| 2,340,500 | Qunick | Feb. 1, 1944 |
| 2,404,212 | Bondley | July 16, 1946 |
| 2,416,899 | Brown | Mar. 4, 1947 |
| 2,423,161 | Spencer | July 1, 1947 |